US010532696B1

(12) United States Patent
Stählin

(10) Patent No.: US 10,532,696 B1
(45) Date of Patent: Jan. 14, 2020

(54) METHOD FOR WARNING A DRIVER OF A VEHICLE ABOUT A POTENTIALLY CRITICAL TRAFFIC SITUATION

(71) Applicant: Continental Teves AG & Co. oHG, Frankfurt am Main (DE)

(72) Inventor: Ulrich Stählin, Rochester, MI (US)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 16/151,509

(22) Filed: Oct. 4, 2018

(51) Int. Cl.
*G08G 1/0967* (2006.01)
*B60Q 9/00* (2006.01)
*H04W 4/40* (2018.01)
*G06N 20/00* (2019.01)
*G08G 1/16* (2006.01)
*B60W 40/08* (2012.01)

(52) U.S. Cl.
CPC ............. *B60Q 9/008* (2013.01); *G06N 20/00* (2019.01); *H04W 4/40* (2018.02); *B60W 40/08* (2013.01); *G08G 1/164* (2013.01)

(58) Field of Classification Search
CPC .......... B60Q 9/008; H04W 4/40; G06N 20/00; B60W 40/08; G08G 1/164
See application file for complete search history.

(56) References Cited

U.S. PATENT DOCUMENTS

2010/0079270 A1* 4/2010 Krautter ............... B60K 35/00
340/436
2016/0133131 A1* 5/2016 Grimm ............... B60W 40/068
701/117
2018/0194282 A1* 7/2018 Wolterman ...... G08G 1/096716

* cited by examiner

*Primary Examiner* — Munear T Akki
(74) *Attorney, Agent, or Firm* — RatnerPrestia

(57) ABSTRACT

A method for warning a driver of a vehicle regarding a potentially critical traffic situation, having the steps of: detecting a potentially critical traffic situation for the vehicle, determining a hazard measure of the potentially critical traffic situation for the vehicle, and outputting a warning to the driver of the vehicle if the hazard measure of the potentially critical traffic situation reaches or exceeds a warning threshold. The warning threshold is adjusted as a function of the information of a self-learning map. A corresponding apparatus as well as the use thereof in a vehicle is also disclosed.

12 Claims, 2 Drawing Sheets

METHOD FOR WARNING A DRIVER OF A VEHICLE ABOUT A POTENTIALLY CRITICAL TRAFFIC SITUATION

FIELD OF THE INVENTION

The invention relates to a method for warning a driver of a vehicle about a potentially critical traffic situation. In addition, the invention relates to a corresponding apparatus as well as the use thereof.

BACKGROUND OF THE INVENTION

The alertness of a driver of a vehicle to the traffic conditions can fluctuate considerably during a journey. It is thus possible for a driver to identify, or respectively react to, critical situations which suddenly occur later than would be the case if he was fully alert. The driver's state of alertness can be monitored, for example, by means of an interior camera, wherein, if it is identified that the driver is not sufficiently alert, he can receive a notification, by way of example, of this deficiency.

Warnings generated by vehicle systems for a driver of a vehicle regarding identified critical traffic situations are usually based on physical calculations, by way of example with respect to a collision that may possible occur. The disadvantage of these is that even if the driver is alert, a warning might be triggered too late, in the event of an imminent potentially critical traffic situation, such that the driver does not have enough time left to recognize the possible critical circumstance in the traffic conditions. This is particularly true of drivers who have relatively little driving experience of the relevant traffic situations or of particularly complex traffic situations which can overwhelm even experienced drivers. As a result, traffic safety can be considerably compromised. On the other hand, a driver can also be distracted by warnings which are output and which he considers to be too premature or respectively unnecessary, and this can therefore likewise jeopardize traffic safety.

SUMMARY OF THE INVENTION

An aspect of the invention is a method, by means of which a state of alertness of a driver of a vehicle as well as the latter's driving experience or respectively expectations with respect to possible critical traffic situations are considered when the warnings are output. It is, in addition, an aspect of the invention to provide a corresponding apparatus for a vehicle, which is configured to execute such a method.

An aspect of the invention describes a method for warning a driver of a vehicle about a potentially critical traffic situation, having the steps of:
  detecting, in particular by means of at least one environment sensor for detecting a vehicle environment and/or a vehicle-to-X communication apparatus, a potentially critical traffic situation for the vehicle,
  determining, in particular by means of an electronic computing device, a hazard measure of the potentially critical traffic situation for the vehicle, and
  outputting, in particular by means of a man-machine interface, a warning to the driver of the vehicle if the hazard measure of the potentially critical traffic situation reaches or exceeds a warning threshold.

An aspect of the invention is characterized in particular in that the warning threshold is adjusted as a function of information comprised by a self-learning map. Accordingly, the vehicle expediently continually monitors the environment during a journey in order to detect potentially critical traffic situations.

According to one embodiment, information of at least one environment sensor of the vehicle, in particular radar, lidar or respectively camera, and/or information which has been received by means of vehicle-to-X communication, is enlisted in order to detect a potentially critical traffic situation. This also expediently comprises enlisting information from a fusion of information of the indicated detection means of the vehicle.

Consequently, the hazard measure of the potentially critical traffic situation illustrates, in particular, a hazard potential of a traffic situation for the vehicle or respectively quantifies this, in order to obtain a comparison variable for comparison with the warning threshold. The warning threshold is accordingly particularly suitable and is provided, based on the hazard measure, in order to predefine the extent of the dangerousness of a traffic situation, as of which a warning is to be output to a driver of the vehicle. By way of example, a traffic situation can be deemed to be hazardous if a collision with or a safety-critical approaching of a further vehicle is determined with the given driving dynamic values of the vehicle.

A self-learning map, which is also referred to as a road graph, can in particular be compiled or respectively updated based on position data of the vehicle and also on the basis of data, by way of example, from other vehicles. Such position data are typically determined by position determination methods such as satellite navigation or triangulation in mobile networks. In this case, it can typically be assumed that a road or respectively drivable route is also located at a position at which a vehicle is located. By assembling appropriate position data, by way of example in the form of a "column of ants", such drivable routes which were not previously known to the self-learning map can be identified. Likewise, amended courses can be determined. This makes it possible to update the self-learning map in real time.

According to one embodiment, information from at least one received vehicle-to-X message is enlisted in order to compile or respectively update the self-learning map. A vehicle-to-X message is typically a message which has been emitted by another road user or an infrastructure facility. This message typically contains at least position data of this other vehicle. In typical implementations of vehicle-to-X communication systems, such messages are directly exchanged between the vehicles, which in particular means that the intermediary of a mobile network or another external infrastructure is not necessary, however such intermediary can also be used. In this case, the received vehicle-to-X messages expediently comprise information about the speed, position, course, acceleration and/or particular events such as, by way of example, breakdowns or emergency braking maneuvers of the road users or respectively infrastructure facilities emitting the messages and can consequently be advantageously enlisted for the identification of critical traffic situations. This information can, as proposed, also be advantageously enlisted for compiling or respectively updating the self-learning map. In order to be able to evaluate received vehicle-to-X messages in a vehicle in order, by way of example, to be able to identify possible risks for the vehicle, it is in principle advantageous anyway to have a very precise map of the surrounding roads available in the vehicle, which is why no additional expenditure is generated by the use of the self-learning map.

An aspect of the invention is based on the realization that the alertness of a driver of a vehicle to the traffic conditions or a driven route is frequently dependent on his knowledge of the route or the existing volume of traffic on the route. A driver's expectations, based on experience, regarding the respective traffic situations concerning the route are fundamental to this. For example, a situation can arise that a driver's alertness is permanently reduced because he believes that the traffic situation patterns will be replicated on a route which he drives repeatedly. This can be the case, for example, if the driver's commute is identical every day.

It was furthermore realized that the information comprised by a self-learning map can be enlisted as an illustration of a driver's knowledge or respectively the fundamental volume of traffic concerning a route.

An aspect of the invention is therefore based on the idea of inferring the driver's experience concerning a route and/or a probable state of alertness of the driver when driving a vehicle on the relevant route at least indirectly by enlisting the information comprised by a self-learning map and, depending on this, adjusting the warning threshold for outputting warnings to the driver. Therefore, a driver's expectations regarding the respective traffic situations concerning a route can be advantageously considered.

A further advantage is the low expenditure for implementing the method in existing systems and the resulting low additional costs.

In addition to any kind of warning displays, warnings within this context are in particular understood to mean any kind of indications for displaying possible reactions to a traffic situation.

According to one further development, the self-learning map comprises data points of an identified route. In particular, the data points describe position data which can be used in this form to reproduce a route. In addition, the data points can comprise further metadata. The warning threshold is adjusted, according to one embodiment, as a function of a number and/or a quality measure of data points of a route of the self-learning map. On the basis of the number or respectively the quality measure, it can be advantageously deduced how frequently the relevant vehicle or other vehicles have presumably already driven the route. In particular, the quality measure of the data points serves to illustrate measuring uncertainties or respectively margins of error of the respective data points. Driving a route more frequently usually results in reduced measuring uncertainties or respectively lower margins of error due to the greater population.

According to one further development, the warning threshold is adjusted in such a way that, in the event of a larger number and/or higher quality measures of the data points of a route of the self-learning map, a warning is provided for a higher hazard measure than for a lower number and/or lower quality measures of the data points of a route of the self-learning map. Consequently, depending on the traffic situation, in the event of a larger number of data points or respectively quality of the data points of the self-learning map, a warning is output to the driver later, by comparison, than if the map has fewer data points or respectively the data points have a lower quality based on a route.

In accordance with one further development, in order to adjust the warning threshold as a function of a number and/or a quality measure of data points of a route of the self-learning map, a distinction is made between data points and/or quality measures of data points produced by the vehicle itself and data points and/or quality measures of data points produced by further road users. The latter can be provided by further road users, in particular, by means of vehicle-to-X communication. The adjustment of the warning threshold can consequently be set, by way of example, as a function of a number of times the route is driven by the vehicle itself and/or by further road users. The presumed experience of the driver of the vehicle can therefore be advantageously considered based on a relevant route. According to one further development, the distinction is made in such a way that a warning is provided for a higher hazard measure if the data points and/or quality measures were produced by the vehicle itself than if the data points and/or quality measures were produced by a further road user.

According to one embodiment, in the event of a potentially critical traffic situation of the vehicle with a further vehicle being determined, the warning threshold is adjusted in such a way that a warning is only provided for a higher hazard measure if the vehicle can be assigned to a road of the self-learning map, by comparison, than if the vehicle cannot be assigned to any route of the self-learning map. Accordingly, in the event of a potentially critical traffic situation of the vehicle with another vehicle being determined, the warning threshold is adjusted in such a way that a warning is provided for a lower hazard measure if the further vehicle cannot be assigned to any route of the self-learning map, by comparison, than if the further vehicle can be assigned to a route of the self-learning map. Consequently, surprising events for a driver, for example if a further vehicle is continuing to move on a route which is relatively unknown to the vehicle itself or on a route which is otherwise not usually used, can advantageously be avoided and, in the case of known routes, no warning which is subjectively felt by the driver to be unnecessarily premature is provided to him.

According to one embodiment, the warning threshold is individually adjusted based on the driver of the vehicle. In particular, this is advantageous if different drivers use the same vehicle, wherein different expectations and, accordingly, warning thresholds can, in each case, be taken as the basis. By way of example, modern vehicles support automated personalized vehicle settings, wherein this can be considered. Alternatively, a manual prompt can also be effected.

According to one embodiment, in order to adjust the warning threshold, information of at least one sensor for monitoring a state of alertness of the driver of the vehicle is furthermore enlisted. By way of example, this is information about the state of alertness of the driver obtained by means of an interior camera.

The self-learning map can be saved, by way of example, in a data memory and executed by means of an electronic computing unit, which also executes the method according to an aspect of the invention. However, it can also be executed, by way of example, in another electronic computing unit which is coupled, by way of example, to the electronic computing unit executing the method. To this end, a vehicle bus system, by way of example a CAN bus system, can in particular be used.

The vehicle can be a motor vehicle, in particular a car, a truck, a motorcycle, an electric vehicle or a hybrid vehicle, a watercraft or an airplane. A road user can be one of the vehicles indicated above or a more vulnerable road user such as, by way of example, a pedestrian or cyclist.

Furthermore, an aspect of the invention relates to an apparatus for warning a driver of a vehicle regarding a potentially critical traffic situation, comprising:
an electronic computing device which is configured to detect a potentially critical traffic situation for the vehicle, by enlisting information obtained by means of at least one environment sensor and/or vehicle-to-X communication and determining a hazard measure of the potentially critical traffic situation for the vehicle, a comparison device which is configured to determine whether the hazard measure of the potentially critical traffic situation is reaching or exceeding a warning threshold, a man-machine interface which is configured to output a warning to the driver of the vehicle if the hazard measure of the potentially critical traffic situation reaches or exceeds a warning threshold, wherein the apparatus is configured in such a way that the warning threshold can be adjusted as a function of the information of a self-learning map.

According to a further aspect of the invention, the apparatus is set up to carry out a method according to at least one of the described embodiments.

In a further development of the indicated apparatus, the indicated apparatus has a memory and a processor. In this case, the indicated method is stored in the memory in the form of a computer program and the processor is provided to execute the method if the computer program is loaded from the memory into the processor.

According to a further aspect of the invention, a computer program comprises program code means in order to carry out all the steps of one of the indicated methods if the computer program is run on a computer or one of the indicated apparatuses.

According to a further aspect of the invention, a computer program product contains a program code which is saved on a computer-readable data carrier and which, if it is run on a data processing device, carries out one of the indicated methods.

Furthermore, an aspect of the invention describes the use of an embodiment of the apparatus in accordance with an aspect of the invention in a vehicle.

BRIEF DESCRIPTION OF THE DRAWINGS

Some particularly advantageous configurations of aspects of the invention are indicated in the subordinate claims. Further preferred embodiments are also set out by the following description of embodiment examples on the basis of schematically represented figures, wherein:

DETAILED DESCRIPTION OF THE PREFERRED EMBODIMENTS

Figure 1:
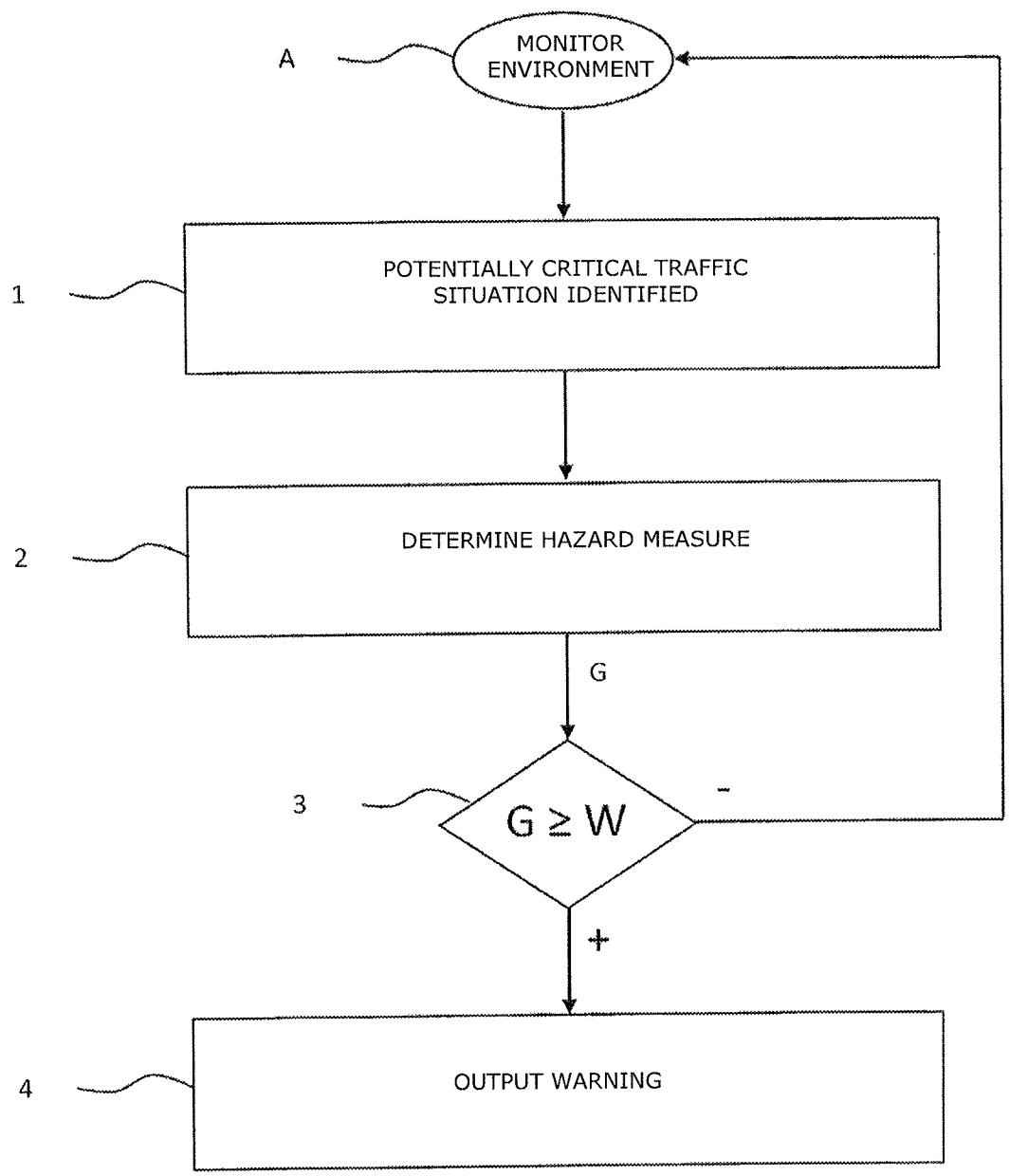
FIG. 1 shows one embodiment of the method according to an aspect of the invention.

FIG. 1 shows one exemplary embodiment of the method for warning a driver of a vehicle regarding a potentially critical traffic situation according to an aspect of the invention. During a journey of the vehicle, the vehicle environment is continually being monitored, represented by step A, by means of environment sensors and/or vehicle-to-X communication, for potentially critical traffic situations such as, by way of example, an anticipated collision with a further road user for a given trajectory and driving dynamics. In this case, a potentially critical traffic situation for the vehicle is identified, in a step 1, and a hazard measure G is determined, in a step 2, in order to illustrate the dangerousness of the potentially critical traffic situation for the vehicle for processing by a computing device. In a step 3, the hazard measure G is compared with a warning threshold W. The warning threshold W is, in this case, adjusted as a function of information comprised by a self-learning map, as a result of which the driver's expectations regarding the respective traffic situations concerning the driven route can be considered. If it is determined in step 3 that hazard measure G is reaching or exceeding the warning threshold W, a warning is output to the driver of the vehicle in step 4, otherwise the environment monitoring is continued in accordance with step A in order to identify a critical traffic condition.

Figure 2:
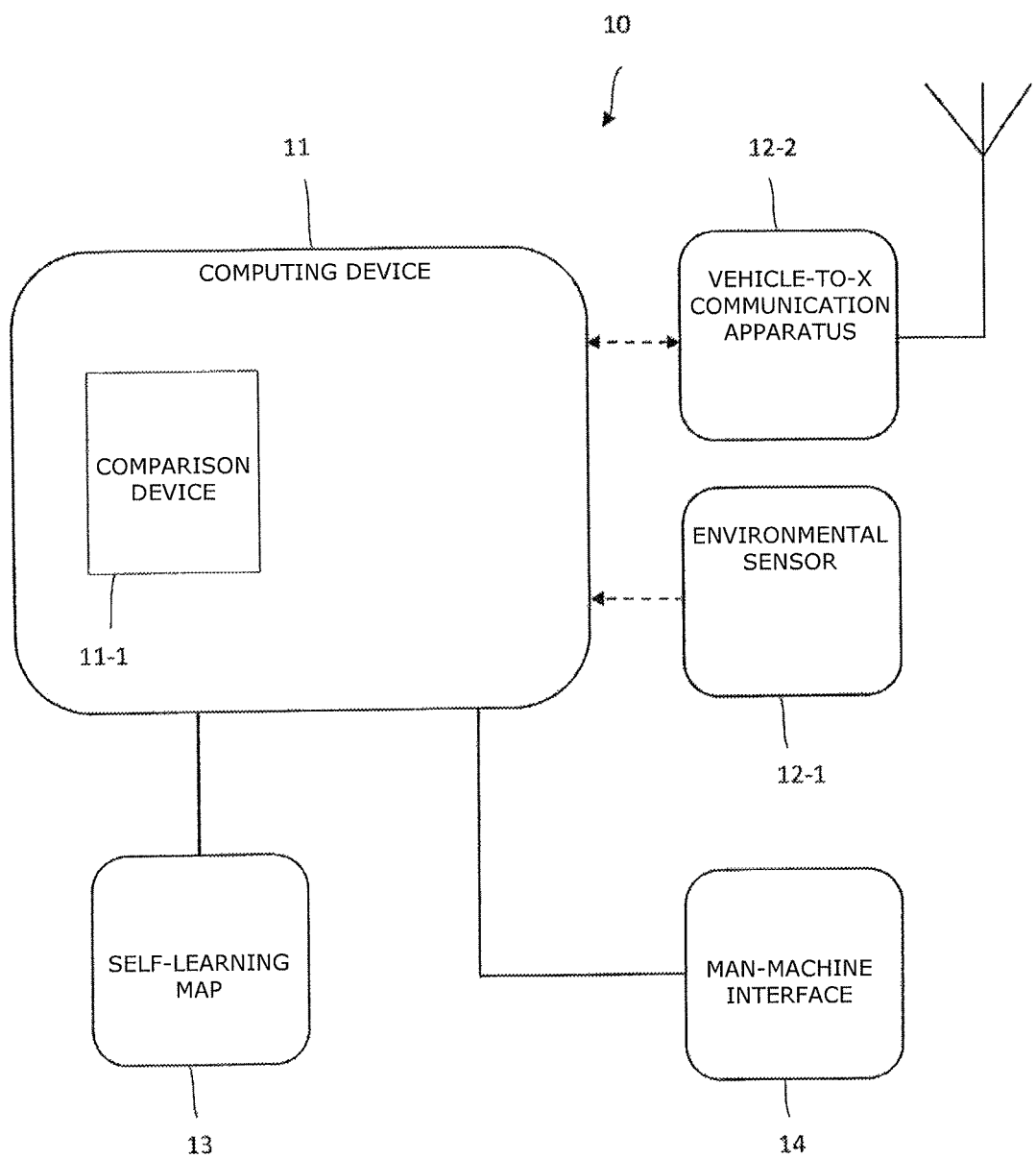
FIG. 2 shows one embodiment example of an apparatus according to an aspect of the invention.

FIG. 2 shows one embodiment example of an apparatus 10 according to an aspect of the invention for warning a driver of a vehicle regarding a potentially critical traffic situation and, in particular, for executing one embodiment of the method according to an aspect of the invention. The apparatus accordingly comprises an electronic computing device 11 which is configured to detect a potentially critical traffic situation for the vehicle by enlisting information, which was obtained by means of an environment sensor 12-1 and/or a vehicle-to-X communication apparatus 12-2 having an antenna. Furthermore, the electronic computing device 11 is configured to determine a hazard measure in order to illustrate the dangerousness of the potentially critical traffic situation for the vehicle and to establish by means of a comparison device 11-1 whether the hazard measure of the potentially critical traffic situation is reaching or exceeding a warning threshold. The apparatus is configured in such a way that the warning threshold can be adjusted as a function of the information of a self-learning map 13, which can in particular be stored in a data memory of the apparatus. If the hazard measure reaches or exceeds the warning threshold, the apparatus is configured to output a warning to the driver of the vehicle by means of a man-machine interface 14, or otherwise to continue detecting the environment in order to identify a critical traffic situation.

If in the course of the proceedings it transpires that a feature or a group of features is not absolutely necessary, then the applicant here and now seeks a wording of at least one independent claim, no longer comprising the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of aspects of the invention, which are described in the various embodiments or embodiment examples and/or shown in the figures, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

It should be pointed out in general that vehicle-to-X communication means, in particular, a direct communication between vehicles and/or between vehicles and infrastructure facilities. By way of example, therefore, vehicle-to-vehicle communication or vehicle-to-infrastructure communication may be involved. Where communication between vehicles is referred to within the framework of this application, this can essentially, by way of example, take place within the framework of vehicle-to-vehicle communication, which typically takes place without the intermediary of a mobile network or a similar external infrastructure and which can therefore be distinguished from other solutions which, by way of example, are based on a mobile network. By way of example, vehicle-to-X communication can take place using the standards IEEE 802.11p or IEEE 1609.4. Vehicle-to-X communication can also be referred to as C2X communication or V2X communication. The sub-areas can be referred to as C2C (Car-to-Car), V2V (Vehicle-to-Vehicle) or C2I (Car-to-Infrastructure). Aspects of the invention expressly does not, however, exclude vehicle-to-X communication with the intermediary of, by way of example, a mobile network.

The invention claimed is:

1. A method for warning a driver of a vehicle about a potentially critical traffic situation, comprising:
   detecting a potentially critical traffic situation for the vehicle, by enlisting information obtained by at least one environment sensor and/or vehicle-to-X communication,
   determining a hazard measure of the potentially critical traffic situation for the vehicle,
   determining whether the hazard measure of the potentially critical traffic situation is reaching or exceeding a warning threshold; and
   outputting a warning to the driver of the vehicle if the hazard measure of the potentially critical traffic situation reaches or exceeds the warning threshold,
   wherein
   the warning threshold is adjusted as a function of information of a self-learning map the self-learning map identifying drivable routes for the vehicle based on at least one of position data of the vehicle and data received by at least one vehicle-to-X communication from an external source.

2. The method according to claim 1, wherein the warning threshold is adjusted as a function of a number and/or a quality measure of data points of a route of the self-learning map.

3. The method according to claim 1, wherein the warning threshold is adjusted in such a way that, in the event of a larger number and/or higher quality measures of the data points of a route of the self-learning map, a warning is provided for a higher hazard measure than for a lower number and/or lower quality measures of the data points of a route of the self-learning map.

4. The method according to claim 2, wherein, in order to adjust the warning threshold, a distinction is made between data points and/or quality measures of data points produced by the vehicle itself and data points and/or quality measures of data points produced by further road users.

5. The method according to claim 1, wherein, in the event of a potentially critical traffic situation of the vehicle with a further vehicle being determined, the warning threshold is adjusted in such a way that a warning is provided for a higher hazard measure if the further vehicle can be assigned to a route of the self-learning map, by comparison, than if the further vehicle cannot be assigned to any route of the self-learning map.

6. The method according to claim 1, wherein the warning threshold is individually adjusted based on the driver of the vehicle.

7. The method according to claim 1, wherein, in order to adjust the warning threshold, information of at least one sensor for monitoring a state of alertness of the driver of the vehicle is furthermore enlisted.

8. An apparatus for warning a driver of a vehicle about a potentially critical traffic situation, comprising:
   an electronic computing device which is configured to detect a potentially critical traffic situation for the vehicle, by enlisting information obtained by at least one environment sensor and/or vehicle-to-X communication and determining a hazard measure of the potentially critical traffic situation for the vehicle,
   a comparison device which is configured to determine whether the hazard measure of the potentially critical traffic situation is reaching or exceeding a warning threshold, and
   a man-machine interface which is configured to output a warning to the driver of the vehicle if the hazard measure of the potentially critical traffic situation reaches or exceeds a warning threshold,
   wherein the warning threshold can be adjusted as a function of the information of a self-learning map, the self-learning map identifying drivable routes for the vehicle based on at least one of position data of the vehicle and data received by the at least one vehicle-to-X communication from an external source.

9. The apparatus according to claim 8, which is set up to execute a method comprising:
   detecting, by the electronic computing device, the potentially critical traffic situation for the vehicle,
   determining, by the comparison device, the hazard measure of the potentially critical traffic situation for the vehicle,
   outputting, by the man-machine interface, the warning to the driver of the vehicle if the hazard measure of the potentially critical traffic situation reaches or exceeds the warning threshold, and
   adjusting the warning threshold as a function of the information of the self-learning map.

10. Use of the apparatus according to claim 8 in a vehicle.

11. The method according to claim 3, wherein, in order to adjust the warning threshold, a distinction is made between data points and/or quality measures of data points produced by the vehicle itself and data points and/or quality measures of data points produced by further road users.

12. Use of the apparatus according to claim 9 in a vehicle.

* * * * *